(12) United States Patent
Miskin

(10) Patent No.: US 8,177,390 B2
(45) Date of Patent: May 15, 2012

(54) ELECTRONIC DISPLAY DEVICE WITH INTEGRATED LIGHTING SYSTEM

(75) Inventor: Michael Miskin, Sleepy Hollow, IL (US)

(73) Assignee: Lynk Labs, Inc., Elgin, IL (US)

( * ) Notice: Subject to any disclaimer, the term of this patent is extended or adjusted under 35 U.S.C. 154(b) by 318 days.

(21) Appl. No.: 12/384,205

(22) Filed: Mar. 31, 2009

(65) Prior Publication Data

US 2009/0244891 A1 Oct. 1, 2009

Related U.S. Application Data

(60) Provisional application No. 61/208,291, filed on Feb. 23, 2009, provisional application No. 61/072,475, filed on Mar. 31, 2008.

(51) Int. Cl.
*F21V 33/00* (2006.01)
*F21V 21/00* (2006.01)

(52) U.S. Cl. ........... 362/234; 362/253; 362/231; 362/85

(58) Field of Classification Search ............. 362/234, 362/253, 231, 85, 33, 97.1, 230, 235, 236, 362/249.12, 249.13, 295
See application file for complete search history.

(56) References Cited

U.S. PATENT DOCUMENTS

| | | | |
|---|---|---|---|
| 4,760,277 A | 7/1988 | Vurpillat | |
| 5,379,201 A * | 1/1995 | Friedman | 362/191 |
| 5,695,269 A | 12/1997 | Lippmann et al. | |
| 5,722,754 A * | 3/1998 | Langner | 362/1 |
| 5,815,225 A | 9/1998 | Nelson | |
| 6,030,088 A * | 2/2000 | Scheinberg | 362/85 |
| 6,036,334 A * | 3/2000 | Nakano | 362/234 |
| 6,089,724 A * | 7/2000 | Shore et al. | 362/85 |
| 6,161,944 A | 12/2000 | Leman | |
| 6,168,292 B1 * | 1/2001 | Sherman | 362/287 |
| 6,238,061 B1 | 5/2001 | McKenzie et al. | |
| 6,406,161 B1 | 6/2002 | Lin et al. | |
| 6,435,690 B1 * | 8/2002 | Till | 362/88 |
| 6,443,604 B1 * | 9/2002 | Rudenberg | 362/488 |
| 6,474,823 B1 | 11/2002 | Agata et al. | |
| 6,776,497 B1 | 8/2004 | Huppi et al. | |
| 6,834,975 B2 | 12/2004 | Chu-Chia et al. | |

(Continued)

FOREIGN PATENT DOCUMENTS

DE 3600132 A1 7/1987

(Continued)

OTHER PUBLICATIONS

International Patent Publication No. WO 2006/046190 A2 to Diederiks et al. published May 4, 2006.

(Continued)

*Primary Examiner* — Bao Q Truong
(74) *Attorney, Agent, or Firm* — Factor Intellectual Property Law Group, Ltd.

(57) ABSTRACT

An electronic visual display system with an integrated general lighting system including an electronic visual display having a housing and one or more lighting devices integrated therewith to provide light to one or more spaces external to the electronic visual display housing. The lighting devices have an independent on and off state which allows for the lighting devices to be in the on state independent of the on and off state of the electronic visual display. The lighting devices provide a relatively constant and user selectable color and level of light output.

34 Claims, 2 Drawing Sheets

U.S. PATENT DOCUMENTS

| | | | |
|---|---|---|---|
| 6,915,155 B2 | 7/2005 | Surwillo et al. | |
| 6,974,223 B2 | 12/2005 | Krietzman | |
| 6,988,812 B2 | 1/2006 | Hsu | |
| 7,004,596 B2 | 2/2006 | Merrem | |
| 7,090,368 B2 | 8/2006 | Oross et al. | |
| 7,113,196 B2 | 9/2006 | Kerr | |
| 7,654,704 B2* | 2/2010 | Zhang et al. | 362/362 |
| 7,823,074 B2* | 10/2010 | Takemura et al. | 715/757 |
| 2002/0085371 A1* | 7/2002 | Katayama et al. | 362/85 |
| 2004/0125234 A1 | 7/2004 | Kim | |
| 2005/0128751 A1* | 6/2005 | Roberge et al. | 362/276 |
| 2005/0206788 A1 | 9/2005 | Eves et al. | |
| 2006/0119565 A1 | 6/2006 | Matsumoto | |
| 2007/0103918 A1 | 5/2007 | Lin | |
| 2007/0121343 A1 | 5/2007 | Brown | |
| 2007/0164975 A1 | 7/2007 | Lim et al. | |
| 2007/0165406 A1 | 7/2007 | Wang | |
| 2008/0018792 A1 | 1/2008 | Bhat et al. | |
| 2008/0031001 A1 | 2/2008 | Sun | |
| 2008/0129662 A1 | 6/2008 | Yoo et al. | |
| 2008/0297591 A1* | 12/2008 | Aarts et al. | 348/51 |
| 2009/0016076 A1 | 1/2009 | Overes et al. | |
| 2009/0040748 A1 | 2/2009 | Kerr | |
| 2009/0045723 A1 | 2/2009 | Ishikawa | |

FOREIGN PATENT DOCUMENTS

| | | |
|---|---|---|
| DE | 9218378 U1 | 1/1994 |
| DE | 202005008776 U1 | 10/2005 |
| DE | 102005025868 A1 | 5/2007 |
| GB | 2381854 | 5/2003 |
| WO | WO 01/17240 A1 | 3/2001 |
| WO | WO2006003604 A1 | 1/2006 |
| WO | 2007015192 A2 | 2/2007 |
| WO | WO2008081383 A1 | 7/2008 |
| WO | 2008133775 A1 | 11/2008 |

OTHER PUBLICATIONS

International Search Report received Mar. 22, 2010 for related International Application.

Extended European Search Report for European Application No. 09822287.0-2423/227455 mailed Jun. 8, 2011.

\* cited by examiner

ELECTRONIC DISPLAY DEVICE WITH INTEGRATED LIGHTING SYSTEM

PRIORITY AND RELATED APPLICATIONS

This Application Claims priority to U.S. Provisional Application No. 61/072,475 entitled Computer Display Work Lighting System Method And Apparatus filed Mar. 31, 2008 and U.S. Provisional Application No. 61/208,291 entitled Display With Integrated General Lighting System Method And Apparatus filed Feb. 23, 2009. The contents of these Applications are incorporated herein by reference.

FIELD OF THE INVENTION

The present invention relates to portable or semi portable lighting devices and fixtures for general lighting such as: table and floor lamps; task lighting; under-cabinet lighting; and track lighting, and to electronic visual display devices which are portable or semi-portable such as: digital photo albums; desktop and portable computers; and, plasma and liquid crystal (LCD) television displays.

BACKGROUND OF THE INVENTION

Electronic visual displays are pervasive in modern society in use for displaying information and entertainment content in consumer electronic products for example televisions, lap top and desk top computer monitors, portable DVD players, and photo or image display devices dedicated to or packaged as, a picture in a frame. Generally these displays utilize liquid crystal or plasma technology. One problem associated with these displays is eye strain based upon the light output of the display and/or inadequate lighting in the viewing area.

Table lamps, floor lamps, under-cabinet and track lighting are exemplary forms of general lighting intended to provide useful amounts of light (usually 100 lumens and above) to support an intended activity. Often these zone or area lighting devices (frequently portable) are used in the same area or even on the same surface as a consumer product having an electronic visual display device to provide better viewing of the display, and/or task or navigation lighting. The available space required for both products then becomes an issue for coordinated use of the products and any other use to be made of the space.

In addition the optimum lighting for an area functionally (e.g. enhancing the view or viewability of the electronic display) or aesthetically, is compromised by the fact that the two devices conflict spatially or locationally, and by virtue of their independent design. For example: a shadow (caused by the display) will exist on the right side of a display when a table top lamp is placed on the left side of the display; a shade for a lamp may not allow it to direct light to the area behind the display device if desired; and a lamp with a clamp-on or other generic connector, is just aesthetically displeasing wherever it may be temporarily clamped, and may not match with a suitable cooperative surface for clamping securely.

In addition, power requirements becomes an issue since mains outlets are spaced by most municipal codes and both products (lighting and display) require a connection to the mains. If both products are "plugged in" then a typical outlet is insufficient for connecting other products to power.

Consumers also sometimes rely upon the light from the display (especially as integrated in a television system) for navigation lighting and perhaps even some task lighting. However, when the display is turned of—a consumer may have insufficient light to navigate to a lighted area, or to a switch to turn on a general lighting device for the room or area.

SUMMARY OF THE INVENTION

The present invention is directed to the provision of an electronic visual display system with an integrated lighting system which is primarily to serve as a portable or semi-portable consumer product. The lighting system is meant to solve the problems identified above and to provide other advantages and meet other various needs in general lighting including general room and area lighting, and certain task lighting.

Broadly, an embodiment of the present invention includes an electronic visual display with a housing and one or more lighting devices integrated therewith. The housing and the one or more lighting devices are cooperatively configured and shaped with respect to each other to enable the secure mounting and attachment of the one to the other as an integrated unit for consumer use while permitting an orientation of the one or more lighting devices so as to provide direct light to one or more spaces external to the electronic visual display. Both the electronic visual display and the one or more lighting devices have an on state and an off state that are independently selectable by an end user. Such a configuration allows an end user to selectably place the one or more lighting devices in an on state to provide light while the electronic visual display is in an off sate or vice versa. Regardless of whether the electronic visual display is in the on or the off state, the one or more lighting devices provide a relatively constant color and relatively constant level of light output when in their "on state."

In an embodiment of the present invention a user interface is provided for the electronic display system which permits an end user to select between the on and the off state of the one more lighting devices and optionally to further select one or more of: a level (or brightness) of light; a color temperature of the light; a color of light; and, a timer for controlling the on and the off state of the one or more lighting devices.

In an embodiment of the present invention a user interface is provided which allows an end user to select certain lighting devices among all of the integrated lighting devices to be in an on state while others are in an off state.

In an embodiment of the present invention a user interface is provided which includes software and a graphic user interface displayed on the electronic visual display device.

In an embodiment of the present invention a user interface is provided which may be a mechanically operated device such as a mechanical switch for selecting between the on state and the off state of the one or more lighting devices.

In an embodiment of the present invention a user interface is provided which includes a transceiver for communicating with a wireless remote control.

In an embodiment of the present invention, one or more lighting devices are adjustably mounted so as to permit an end user to adjust the output direction of the direct light emitted by the one or more lighting devices.

In an embodiment of the present invention an electronic display system is provided with an integrated lighting system wherein the level of light provided by the one or more lighting devices is about 100 lumens or greater.

In an embodiment of the present invention one or more lighting devices are provided utilizing one or more: incandescent light devices; halogen light devices; fluorescent light devices; compact fluorescent light devices; light emitting diodes (LEDs); and/or organic light emitting diodes (OLEDs); or any combination of these as appropriate for a given lighting goal.

In certain embodiments of the present invention one or more lighting devices are provided which employ one or more light emitting diodes ("LEDs") or organic light emitting diodes ("OLEDs") either of which are driven by AC voltage and current.

In an embodiment of the present invention the one or more light sources are provided which provide white light, preferably in a color temperature range of about 2500K to 7500K.

In an embodiment of the present invention white light is provided using white LEDs.

In an embodiment of the present invention white light is provided using Red/Green/Blue LEDs or OLEDs. Where Red/Green/Blue LEDs or OLEDs are utilized to produce white light, the one or more lighting devices may selectively be used to provide colored lighting.

In an embodiment of the present invention a single connector is provided for connecting both the electronic visual display and the one or more lighting devices to a mains power outlet.

In an embodiment of the present invention the electronic visual display is any one of a component of a television system, a user display interface for a computer (i.e. a computer monitor), or a component of an electronic picture frame device.

In an embodiment of the present invention direct light can be provided to spaces located behind, to the side of, below, or above an electronic visual display housing.

In an embodiment of the present invention a lens and/or reflector is provided for use with one or more lighting devices, especially LED or OLED based devices, integrated into an electronic visual display system.

DETAILED DESCRIPTION OF PREFERRED EMBODIMENTS

Figure 1:
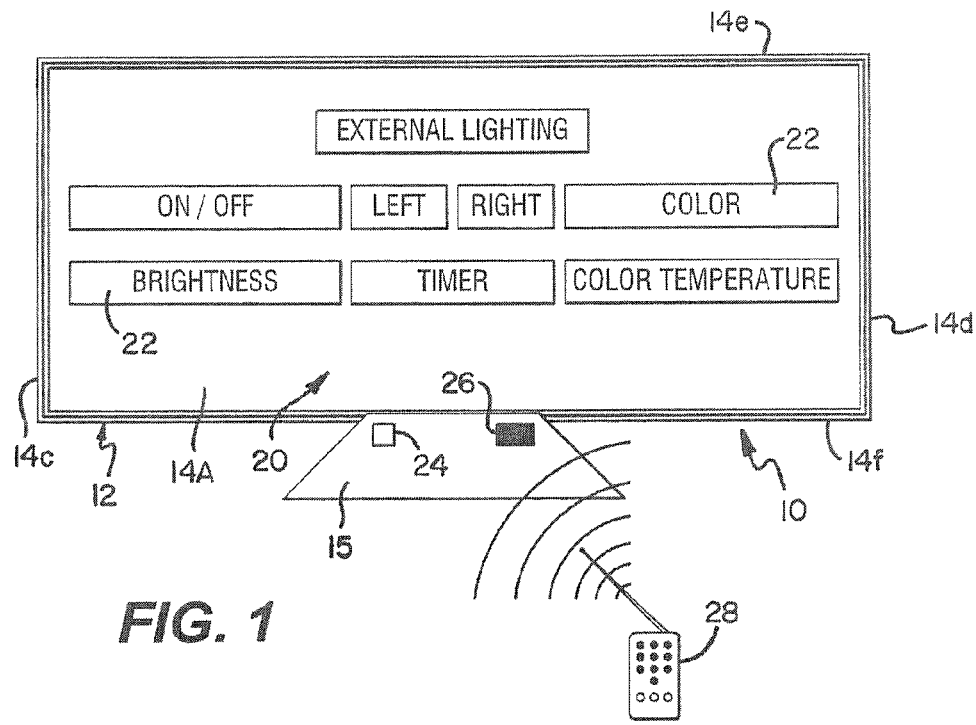
FIG. 1 is a schematic front view of an embodiment of an electronic visual display according to the invention.

While the present invention is capable of embodiment in many different forms, there is shown in the drawings and will herein be described in detail, preferred embodiments of the invention with the understanding that the present disclosure is to be considered as an exemplification of the principles of the invention and is not intended to limit the broad aspect of the invention to the embodiments illustrated.

FIGS. 1-5 disclose an electronic visual display system with an integrated lighting system 10, having various embodiments of lighting devices 16. System 10 includes an electronic visual display 12 having a housing 14.

Figure 2:
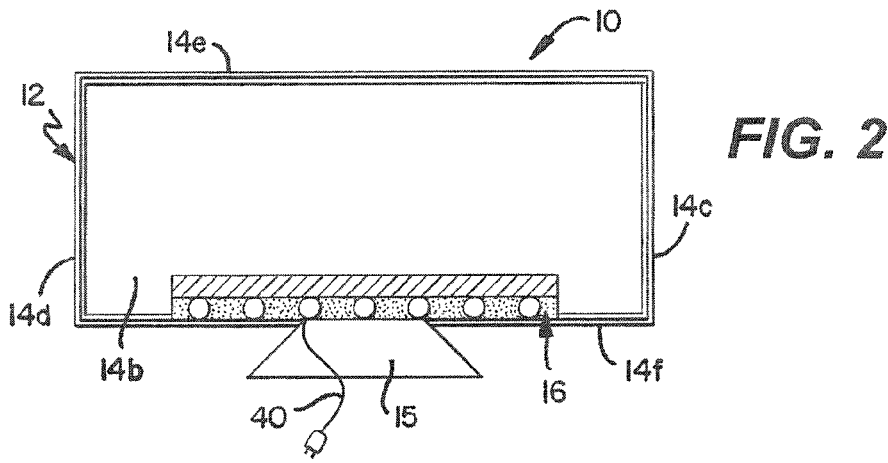
FIG. 2 is a schematic back view of the electronic visual display of FIG. 1 with a first embodiment of an integrated lighting system.
Figure 3:
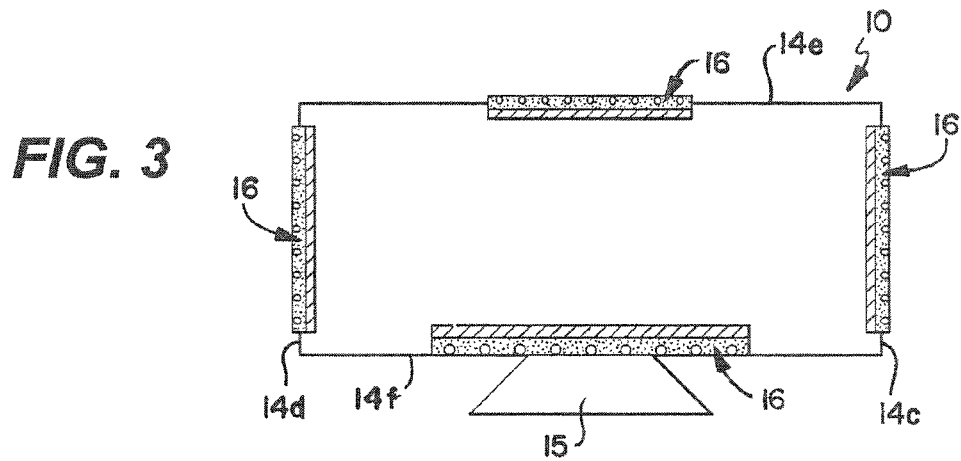
FIG. 3 is a schematic back view of the electronic visual display of FIG. 1 with a second embodiment of an integrated lighting system.
Figure 4:
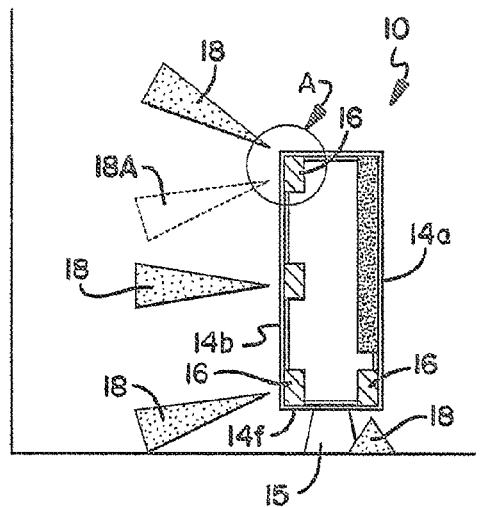
FIG. 4 is a schematic cross sectional view of the electronic visual display of FIG. 1 with a third embodiment of an integrated lighting system.
Figure 5:
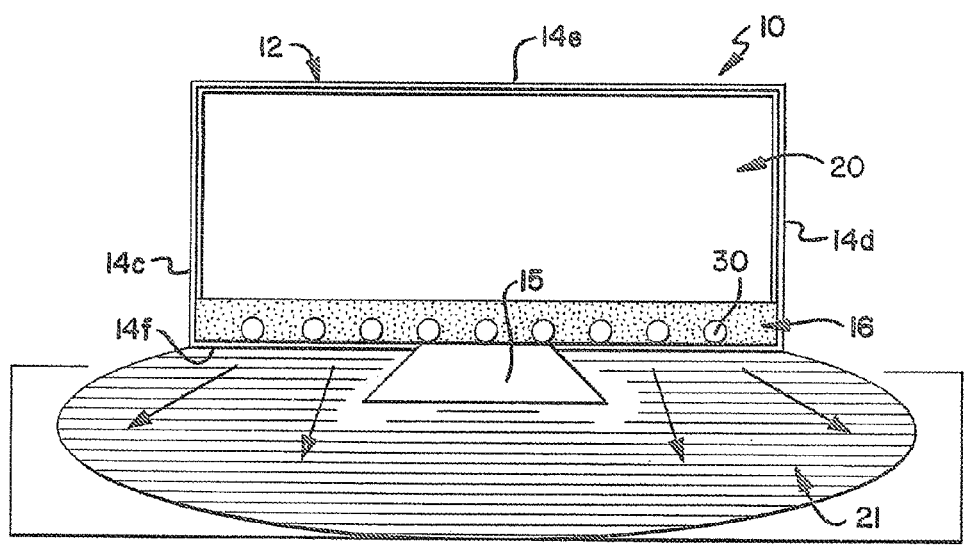
FIG. 5 is a schematic front view the electronic visual display with a fourth embodiment of an integrated lighting system according to the invention; and, FIG. 6 is a schematic top view of a lighting device employed in the electronic visual display with the integrated lighting system shown in FIGS. 1-5.

FIG. 2 discloses a first embodiment of system 10 having one lighting device 16, while FIG. 3 discloses a second embodiment of system 10 with four lighting devices 16. FIG. 4 in turn discloses a third embodiment of system 10 having four lighting devices 16 in a different arrangement than the four lighting devices 16 in the second embodiment of FIG. 3. FIG. 5 discloses yet another embodiment (fourth) of system 10 with yet another arrangement with a single lighting device 16 directing light to a surface in front of and below the electronic visual display 12.

In all embodiments housing 14 has the following sides: front 14a; back 14b; left 14c; right 14d; top 14e; and, bottom 14f. The housing 14 generally surrounds and protects any internal components employed with the display for the particular use of the electronic visual display 12 (e.g. television, computer interface/monitor or picture-frame device display).

The front side 14a of housing 14 contains display screen 20 where the displayed content is visible. This display screen 20 in embodiments such as television and computers is part of the information, entertainment, or user interface content.

The lighting devices 16 are integrated with housing 14. "Integrated" as used herein means that the lighting devices, no matter what form of light (e.g. LED or incandescent) are mounted in any suitable way known to those of ordinary skill in the art wherein portions of the housing 14 and the lighting devices 16 are cooperatively configured and shaped with respect to each other to allow for the secure mounting and attachment of one to the other in a way which permits a relatively convenient and relatively aesthetically acceptable consumer package. Secure means an attachment which withstands normal impacts during use and in some cases means resisting removal without the aid of tools. Integration may include by way of example the molding or otherwise forming of certain surfaces or bezels in the housing to fittingly accept the lighting devices for secure attachment. Integrated does not exclude the use of fasteners such as: screws, rivets, or glue and the like, nor does it exclude press fit and snap fit configurations and the like. Integrated however, does not mean that the lighting devices, including bulbs or other subcomponents may not need to be assembled by a consumer or product dealer.

The lighting devices 16 are integrated or mounted in a manner which permits an orientation of the lighting devices 16 to provide direct light into one or more spaces external to the electronic visual display 12 and hosing 14. Direct light means light (or a beam of light) which is in the direct line of sight of the light-producing device, in other words, non-reflected light.

FIG. 4 discloses an example of direct lighting to a wall surface (wall identified as "W") in three separate external areas all of which are behind the housing 14 (as indicated by the three light beams 18). Each light beam 18 is provided by a separate lighting device 16 located on the rear side 14b of housing 14. FIG. 4 also discloses a lighting device 16 located on a bottom side 14f of housing 14 to provide direct light (see another beam 18) to the external area between bottom side 14f of housing 14 and a surface upon which the electronic visual display is resting (via base 15).

FIG. 2 discloses an embodiment where a lighting device 16 is mounted on the rear side 14b of housing 14 near the bottom of the housing (14f) where direct light will be subtle and reflected light off of a wall will be accentuated. FIG. 3 discloses lighting devices 16 oriented to provide direct lighting upward, downward and to both sides (14c, 14d) of the housing 14. This embodiment would serve to provide a significant portion of the general lighting employed in a room. By contrast, FIG. 5 discloses an embodiment with a lighting device 18 located on the front side 14*a* of the housing 14 near the bottom 14*f* to provide counter-top or task lighting.

As is known in the art, the electronic visual display 12 as well as its complimentary components for a television or desk top computer for example, include an on and an off state. These states are generally selectable by an end user or consumer utilizing the system 10. According to an embodiment of the invention however, the display system 10 provides an independently controlled on and off state for the lighting devices 16. In other words, the on and off state of the lighting devices 16 are selected independent of the on and the off state of the electronic visual display 12 and related components. In this configuration the system 10 can serve strictly as general lighting device. Accordingly, when a user turns off the visual display device 12—he/she can choose to leave the lighting devices 16 on for general or task lighting depending on the number, location, and orientation of the lighting devices 16. This function permits more safety for navigation and convenience for the consumer. It also completes the function (the first part of which is providing light) of a general lighting device—that function being operational separation from the visual display. Advantageously this is accomplished without taking up the space required by a separate lighting device like a lamp.

For a general lighting use, the embodiments disclosed herein will provide no less than about 100 lumens in aggregate. Greater brightness or level of light may be provided by the number and type of lighting devices 16 employed.

FIG. 1 discloses a means for controlling the system 10. In particular, FIG. 1 discloses a user interface for controlling the electronic visual display 12 and the lighting devices 16. The user interface comprises a display screen 20, a graphic user interface 22 generated by software (not shown) in the system 12 and shown on the display screen 20, an infrared transceiver 26 located on base 15, and a remote infrared transceiver 28. By using the remote transceiver 28 to communicate with transceiver 26 and in combination with the graphic user interface 22 disclosed in FIG. 1, the following adjustments to the lighting devices 16 can be made: the on and off state of the light devices 16; the level or brightness of light emitted by the lighting devices 16; the color temperature of light emitted by the lighting devices 16; the color of light emitted by the lighting devices 16; which of the one or more lighting devices 16 (left bank of lights or right bank of lights) are to be controlled by the action; and/or a timer for controlling the on and the off state of the one or more lighting devices 16.

In an alternative embodiment disclosed in FIG. 1 mechanical switch 24 may be used in conjunction with, or in place of, graphic user interface 22. Switch 24 may be used to turn the lighting device 16 on and off and may provide a dimming function. Other switches or mechanical or eletro-mechanical buttons or key pads (not shown) may be provided to provide some or all of the options available on the graphic user interface discussed above.

In a preferred embodiment, the remote 28, the transceiver 26 and graphic user interface 22 may be used to control both the electronic visual display 12 and the lighting devices 16.

In order to provide light, the lighting devices 16 may utilize one or more of the following: incandescent light bulbs/devices; halogen light bulbs/devices; fluorescent light bulbs/devices; compact fluorescent light bulbs/devices; LED or OLED devices; or combinations of these various sources to provide the lighting design desired for a particular consumer product or intended use.

In an embodiment where primarily general lighting is desired, the lighting devices 16 provide white light, preferably in the color temperature range of about 2500K to 7500K. As is known in the art—especially if LED or OLED lighting devices are employed, focusing lenses and reflectors may be desired for focusing light and enhancing power-to-lighting efficiency.

In some embodiments, white light may be provided by either white LEDs/OLEDs or by Red/Green/Blue LEDs/OLEDs in combination. In embodiments utilizing Red/Green/Blue LEDs, the lighting devices 16 may selectively (such as by the user interface or by factory setting) provide colored light.

In some embodiments the LEDs or OLEDs are advantageously powered directly by the AC voltage and current, avoiding the components and inefficiencies associated with adding DC power to the system 10.

As used herein, "lighting device" means the light producing entity, for example an LED or an incandescent bulb, and the associated hardware and circuitry to physically support the entity and to interface it alone or with other such entities with electrical power. A lighting device may also include things such as heat sinks, circuit boards, housings, electrical connectors, sockets, lenses 44, reflectors 46 (both lenses 44 and reflectors 46 are shown in FIG. 6), and necessary circuit components like resistors, capacitors, transistors, ballasts, and drivers as are known or are to be developed in the art.

Figure 6:
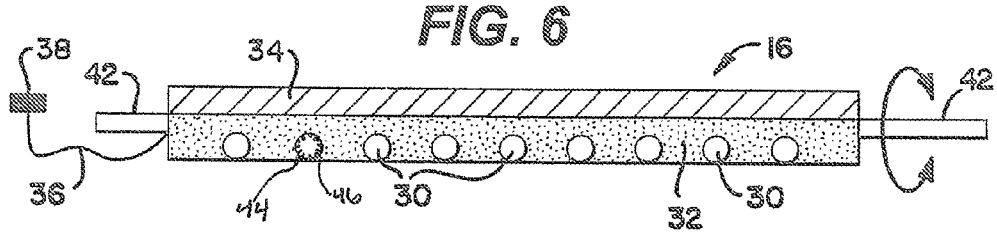

FIG. 6 discloses an exemplary embodiment of a lighting device 16 which includes nine entities of elements 30. The lighting element 30 is integrated with a printed circuit board "PCB" 32. The PCB 32 is integrated within and/or to, a heat sink 34 to manage heat generation by the lighting element 30. The heat sink 34 may also act as a cooperative portion of the lighting device 16 for mounting to the housing 14. The PCB 32 may include at least one pair of electrical leads 36 and a connector 38 to connect the lighting device assembly to a power and/or control switch.

FIG. 6 also discloses (as optional structure) pins 42 at the ends of the PCB 32. The pins 42 can be used to mount PCB 32 that so that it can be rotated, in the directions of the arrow shown in FIG. 6. This type of mounting of a lighting device 16 can (aside from its location on and mounting orientation with respect to, housing 14)—provide additional means for orienting, and in fact selectably changing, the focus or direction of the direct lighting into areas external to the housing 14. FIG. 4 discloses such a rotation of the upper most beam 18 between the solid and phantom position 18A. In differing embodiments the rotation can be accomplished manually or by means of small electric motors or the like as are known in the art.

FIG. 2 discloses that the system 10 requires only a single connector 40 in the form of a standard power chord with a male wall plug terminal end for connecting the system 10 to the mains power. Internally to housing 14, connector 38 of the PCB 32 (for each lighting device 16) is conductively coupled with circuitry powered by the connection made by connector 40. Advantageously, according to this embodiment of the invention, a single power cord and a single power outlet is required to operate both the visual display 12 and the general lighting function provided by system 10. This makes outlet space available for other uses desired by the consumer without outlet multiplexing devices.

It should be appreciated (in view of the disclosure and claims herein) by those of skill in the art that the electronic visual display 12 as configured with the lighting devices disclosed can embody or be applied to numerous devices advantageously. For example it is proposed that an electronic visual display, such as display 12, with an integrated lighting system may be used: as a component of a television system; as a user interface (i.e. monitor) for a desktop computer; and/or, as an electronic picture frame display. In such embodiments, a housing such as housing 14 houses may or will necessarily or advantageously also house electronic components related to the use of the display For example, for a television, housing 14 would likely include some electronics required to receive and display a broadcast or subscriber signal television signal.

As should similarly be appreciated, one or more lighting devices (such as devices 16) when integrated with displays intended to be used in environments where general lighting is desired, will provide significant benefits especially where space and power outlet accessibility are an issue for the consumer.

While specific embodiments of the present invention have been illustrated and described, numerous modifications come to mind without significantly departing from the spirit of the invention, and the scope of protection is only limited by the scope of the accompanying claims.

What is claimed is:

1. An electronic visual display system with an integrated lighting system comprising:
   a. an electronic visual display having a housing;
   b. one or more lighting devices;
   c. the housing and the one or more lighting devices being cooperatively configured and shaped with respect to each other for secure mounting and attachment of the one to the other as an integrated unit for consumer use and permitting an orientation of the one or more lighting devices so as to provide direct light to one or more spaces external to the electronic visual display wherein at least a portion of the one or more lighting devices is located inside the housing;
   d. the electronic visual display having an on state and an off state selectable by an end user;
   e. the one or more lighting devices having an on and an off state selectable by the end user, the on and the off state of the one or more lighting devices being selectable independent of the on and the off state of the electronic visual display such that the one or more lighting devices may be in an on state providing light while the electronic visual display is in an off state; and,
   f. the one or more lighting devices providing a relatively constant color and relatively constant level of light output during the on state of the one or more lighting devices, wherein the relatively constant level of light may be adjusted by the end user brightening or dimming the one or more lighting devices.

2. The electronic visual display system of claim 1 further comprising a user interface to the visual display system, the user interface permitting an end user to select between the on and the off state of the one or more lighting devices and optionally to further select one or more of: a level of light; a color temperature of light; a color of light; and, a timer for controlling the on and the off state of the one or more lighting devices.

3. The electronic visual display system of claim 2 wherein the user interface allows an end user to select which of the one or more lighting devices are in the on state and which are in the off state.

4. The electronic visual display system of claim 2 wherein the user interface comprises software and a graphic user interface displayed on the electronic visual display device.

5. The electronic visual display system of claim 2 wherein the user interface comprises a mechanically operated switch for switching between the on and the off states.

6. The electronic visual display system of claim 2 wherein the user interface comprises a receiver for receiving wirelessly transmitted control signals.

7. The electronic visual display system of claim 1 wherein the one or more lighting devices are mounted to permit an end user to adjust the output direction of the light emitted by the one or more lighting device.

8. The electronic visual display system of claim 1 wherein the level of light provided by the one or more lighting devices is about 100 lumens or greater.

9. The electronic visual display system of claim 1 wherein the one or more lighting devices may be selected from the group comprising: incandescent light device; halogen light device; fluorescent light device; compact fluorescent light device; LEDs; and, OLEDs and combinations thereof.

10. The electronic visual display system of claim 1 wherein the one or more lighting devices comprise one or more LEDs driven by AC voltage and current.

11. The electronic visual display system of claim 10 wherein the LEDs are of OLED construction.

12. The electronic visual display system of claim 9 wherein the one or more lighting devices provide white light.

13. The electronic visual display system of claim 12 wherein the white light provided by the LEDs is in the color temperature range of about 2500K to 7500K.

14. The electronic visual display system of claim 12 wherein white light is provided using white LEDs.

15. The electronic visual display system of claim 12 wherein white light is provided using Red/Green/Blue LEDs in combination.

16. The electronic visual display system of claim 15 wherein the Red/Green/Blue LEDs may selectively provide colored light.

17. The electronic visual display system of claim 12 wherein the white light provided by the OLEDs is in the color temperature range of about 2500K to 7500K.

18. The electronic visual display system of claim 12 wherein white light is provided using white OLEDs.

19. The electronic visual display system of claim 12 wherein white light is provided using Red/Green/Blue OLEDs.

20. The electronic visual display system of claim 19 wherein the Red/Green/Blue OLEDs may selectable provide colored light.

21. The electronic visual display system of claim 1 further comprising a connector for connecting the system to a mains power outlet.

22. The electronic visual display of claim 21 wherein both of the electronic visual display and the one or more lighting devices are powered from current and voltage provided by the connector.

23. The electronic visual display system of claim 1 wherein the electronic visual display is a component of a television system.

24. The electronic visual display system of claim 1 wherein the electronic visual display is adapted as a component of the user interface for a desktop computer.

25. The electronic visual display system of claim 1 wherein the electronic visual display is an integrated component of an electronic picture frame display device.

26. The electronic visual display system of claim 1 wherein the one or more external spaces to the electronic visual display are located behind the electronic visual display housing.

27. The electronic visual display system of claim 1 wherein the one or more external spaces to the electronic visual display are located to the side of the electronic visual display housing.

28. The electronic visual display system of claim 1 wherein the one or more external spaces to the electronic visual display are located below the electronic visual display housing.

29. The electronic visual display system of claim 1 wherein the one or more external spaces to the electronic visual display are located above the electronic visual display.

30. The electronic visual display system of claim 1 further comprising that the one or more lighting devices are covered a lens for directing lighting.

31. The electronic visual display system of claim 1 further comprises one or more light reflectors for the one or more lighting devices.

32. An electronic visual display system with an integrated lighting system comprising:
   a. an electronic visual display having a housing;
   b. one or more lighting devices;
   c. the one or more lighting devices being integrated with the housing such that at least a portion of the one or more lighting devices is located inside the housing and the one or more lighting devices are be orientated so as to provide direct light to one or more spaces external to the electronic visual display;
   d. the electronic visual display having an on state and an off state selectable by an end user;
   e. the one or more lighting devices having an on and an off state selectable by the end user, the on and the off state of the one or more lighting devices being selectable independent of the on and the off state of the electronic visual display such that the one or more lighting devices may be in an on state providing light while the electronic visual display is in an off state; and,
   f. the one or more lighting devices providing a relatively constant color and relatively constant level of light output during the on state of the one or more lighting devices, wherein the end user may adjust:
      the relatively constant level of light by brightening or dimming the one or more lighting devices; and,
      a color temperature of the relatively constant color.

33. The electronic visual display of claim 32 further comprising a user interface to the visual display system, the user interface permitting an end user to select between the on and the off state of the one or more lighting devices and allow the end user to adjust the constant level of light provided by, and the color temperature of, the one or more light sources.

34. An electronic visual display system with an integrated lighting system comprising:
   a. an electronic visual display having a housing;
   b. one or more lighting devices;
   c. the one or more lighting devices being integrated with the housing such that at least a portion of the one or more lighting devices is located inside the housing and the one or more lighting devices are be orientated so as to provide direct light to one or more spaces external to the electronic visual display;
   d. the electronic visual display having an on state and an off state selectable by an end user;
   e. the one or more lighting devices having an on and an off state selectable by the end user, the on and the off state of the one or more lighting devices being selectable independent of the on and the off state of the electronic visual display such that the one or more lighting devices may be in an on state providing light while the electronic visual display is in an off state; and,
   f. the one or more lighting devices providing a relatively constant color and relatively constant level of light output during the on state of the one or more lighting devices, wherein the end user may adjust:
      the relatively constant level of light by brightening or dimming the one or more lighting devices; and,
      a color temperature of the relatively constant color between approximately 1500K and 12000K.

* * * * *